US010318358B2

(12) United States Patent
Eberhard

(10) Patent No.: US 10,318,358 B2
(45) Date of Patent: Jun. 11, 2019

(54) SYSTEM AND METHOD FOR EXTENDING A WEB SERVICE ENVIRONMENT TO SUPPORT SCALABLE ASYNCHRONOUS CLIENTS

(71) Applicant: Oracle International Corporation, Redwood Shores, CA (US)

(72) Inventor: Ryan Eberhard, Marengo, OH (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 135 days.

(21) Appl. No.: 15/711,610

(22) Filed: Sep. 21, 2017

(65) Prior Publication Data

US 2018/0011749 A1 Jan. 11, 2018

Related U.S. Application Data

(63) Continuation of application No. 13/234,871, filed on Sep. 16, 2011, now Pat. No. 9,785,482.

(60) Provisional application No. 61/384,232, filed on Sep. 17, 2010.

(51) Int. Cl.
*G06F 9/54* (2006.01)
*H04L 29/08* (2006.01)

(52) U.S. Cl.
CPC ................ *G06F 9/54* (2013.01); *G06F 9/546* (2013.01); *H04L 67/16* (2013.01)

(58) Field of Classification Search
CPC ......... H04L 67/02; H04L 67/16; G06F 15/16; G06F 9/546
See application file for complete search history.

(56) References Cited

U.S. PATENT DOCUMENTS 7,426,194 B2 * 9/2008 Shenfield ............ H04M 3/4938 370/324
7,962,127 B2 6/2011 Shenfield
8,396,973 B2 * 3/2013 Wang ................ H04L 29/06027 709/204

(Continued)

OTHER PUBLICATIONS

"Oracle Fusion Middleware" Oracle, Jan. 2011.*

(Continued)

*Primary Examiner* — David R Lazaro
(74) *Attorney, Agent, or Firm* — Tucker Ellis LLP

(57) ABSTRACT

An asynchronous transport enables decoupling the delivery of an operation's request and response messages, from the request and response cycle of a single exchange on the transport. The response message need not be delivered as the response to the initial transport request, but can instead be delivered by the web service to a response endpoint or other location selected by the client, using a new connection originating from the service. In accordance with an embodiment, the client communicates with the web service via request messages that include a SOAP header, formatted according to an XML format, and conveyed using the HTTP. The asynchronous transport automatically deploys, for a client, an endpoint reference that will ultimately receive corresponding response messages. This allows the response to ultimately return to the client application in a manner consistent with the JAX-WS specification, without the developer having to change their original client application.

19 Claims, 5 Drawing Sheets

(56) References Cited

U.S. PATENT DOCUMENTS

| | | | | |
|---|---|---|---|---|
| 8,484,281 | B2 | 7/2013 | Jin | |
| 2002/0133641 | A1* | 9/2002 | Royer | G06F 21/41 719/329 |
| 2003/0005181 | A1* | 1/2003 | Bau, III | G06F 8/34 719/330 |
| 2003/0023957 | A1* | 1/2003 | Bau, III | G06F 8/20 717/140 |
| 2003/0065826 | A1* | 4/2003 | Skufca | G06F 17/30902 719/315 |
| 2003/0065827 | A1* | 4/2003 | Skufca | G06F 9/465 719/315 |
| 2003/0121051 | A1* | 6/2003 | Howe | H04N 7/165 725/100 |
| 2003/0206192 | A1* | 11/2003 | Chen | H04L 29/06 715/733 |
| 2004/0255006 | A1* | 12/2004 | Collet | H04L 29/08846 709/218 |
| 2005/0021689 | A1* | 1/2005 | Marvin | G06F 8/31 709/220 |
| 2005/0203949 | A1* | 9/2005 | Cabrera | H04L 67/02 |
| 2006/0206614 | A1* | 9/2006 | Kaczmarski | H04L 63/08 709/228 |
| 2007/0064680 | A1* | 3/2007 | Savchenko | H04L 67/16 370/352 |
| 2007/0067383 | A1* | 3/2007 | Savchenko | H04L 67/02 709/203 |
| 2007/0067411 | A1* | 3/2007 | Angelov | G06F 9/546 709/217 |
| 2007/0067461 | A1* | 3/2007 | Savchenko | H04L 67/02 709/227 |
| 2007/0067473 | A1* | 3/2007 | Baikov | H04L 67/02 709/230 |
| 2007/0067474 | A1* | 3/2007 | Angelov | H04L 67/02 709/230 |
| 2007/0067479 | A1* | 3/2007 | Angelov | H04L 67/16 709/231 |
| 2007/0067494 | A1* | 3/2007 | Savchenko | H04L 67/02 709/246 |
| 2007/0156859 | A1* | 7/2007 | Savchenko | H04L 67/02 709/220 |
| 2007/0162539 | A1* | 7/2007 | Jin | G06F 17/30887 709/201 |
| 2007/0162549 | A1* | 7/2007 | Jin | G06Q 30/06 709/206 |
| 2007/0162560 | A1* | 7/2007 | Jin | G06Q 10/10 709/217 |
| 2007/0174288 | A1* | 7/2007 | Stoyanova | H04L 67/02 |
| 2008/0228851 | A1* | 9/2008 | Angelov | G06F 17/30893 709/201 |
| 2008/0228860 | A1* | 9/2008 | Angelov | G06F 17/30873 709/202 |
| 2008/0289039 | A1* | 11/2008 | Rits | H04L 63/123 726/22 |
| 2008/0313730 | A1* | 12/2008 | Iftimie | G06F 21/40 726/17 |
| 2009/0125595 | A1* | 5/2009 | Maes | H04L 51/12 709/206 |
| 2009/0282136 | A1* | 11/2009 | Subramanian | G06F 8/30 709/222 |
| 2009/0319497 | A1* | 12/2009 | Bolognese | G06F 9/547 |
| 2009/0327401 | A1* | 12/2009 | Gage | G06F 15/16 709/203 |
| 2010/0235844 | A1* | 9/2010 | Arwe | G06F 9/50 718/104 |
| 2010/0241729 | A1 | 9/2010 | Angelov | |
| 2010/0251262 | A1* | 9/2010 | Rokicki | G06F 9/546 719/314 |
| 2011/0113435 | A1 | 5/2011 | Angelov | |
| 2012/0079463 | A1* | 3/2012 | Freeman | G06F 8/456 717/137 |
| 2012/0102109 | A1* | 4/2012 | Eberhard | G06F 9/54 709/204 |
| 2012/0210335 | A1* | 8/2012 | Salt | G06F 9/541 719/315 |
| 2012/0322470 | A1* | 12/2012 | Said | G06Q 10/107 455/466 |

OTHER PUBLICATIONS

Brambilla, Marco et al., "Managing Asynchronous Web Services Interactions", Proceedings of the IEEE International Conference on Web Services (ICWS) 2004, 8 Pages.

Zdun, Uwe et al., "Design and Implementation of an Asynchronous Invocation Framework for Web Services" ICWS-Europe 2003, LNCS 2853, pp. 64-78, 2003, © Springer-Verlag Berlin Heidelberg 2003, 15 Pages.

Oracle®, Oracle® Fusion Middleware Programming Advanced Features of JAX-WS Web Services for Oracle Weblogic Server, 11g Release (10.3.4), Jan. 2011, 256 Pages.

* cited by examiner

SYSTEM AND METHOD FOR EXTENDING A WEB SERVICE ENVIRONMENT TO SUPPORT SCALABLE ASYNCHRONOUS CLIENTS

CLAIM OF PRIORITY

This application is a continuation of U.S. patent application Ser. No. 13/234,871 filed Sep. 16, 2011 titled "SYSTEM AND METHOD FOR EXTENDING A WEB SERVICE ENVIRONMENT TO SUPPORT SCALABLE ASYNCHRONOUS CLIENTS" and which application claims the benefit of priority to U.S. Provisional Patent Application No. 61/384,232 filed Sep. 17, 2010 titled "SYSTEMS AND METHODS FOR PROVIDING IMPROVED FUNCTIONALITY IN AN APPLICATION SERVER SYSTEM" which applications are herein incorporated by reference in their entirety.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

Embodiments of the present invention are generally related to application middleware and web services, and are particularly related to systems and methods for extending a web service environment to support scalable asynchronous clients.

BACKGROUND

Generally, a web service is a software component that supports machine-to-machine service-based interaction over a network, such as the Internet or another form of network. Typically, each web service includes an interface that is described in a Web Services Description Language (WSDL). Other systems can interact with the web service by sending requests to the interface, typically in the form of Simple Object Access Protocol (SOAP) messages, formatted according to an Extensible Markup Language (XML) format, and conveyed to the web service using the Hypertext Transfer Protocol (HTTP).

The Java API for XML Web Services (JAX-WS) is a programming language API specification that is provided as part of the Java EE platform, for use in creating web services. JAX-WS uses annotations to simplify the development and deployment of web service clients and endpoints. However, although the JAX-WS specification and associated reference implementation provides some support for enabling asynchronous clients, JAX-WS primarily addresses asynchronous threading at the client. However, as soon as the request interacts with the message transport, such as by communicating an HTTP request to a service at a remote server, it will block at the client. While attempts have been made to add asynchrony in the transport, such that the service can respond immediately, this adds complexity to the client, which becomes a de facto server. When the client is itself part of a larger application, or participates in a larger environment such as a cluster, where the needs are more sophisticated, the added complexity creates a burden on the developer in developing their applications, and can affect performance. These are the general areas that embodiments of the invention are intended to address.

SUMMARY

Disclosed herein are systems and methods for extending a web service environment to support scalable asynchronous clients. An asynchronous transport enables decoupling the delivery of an operation's request and response messages, from the request and response cycle of a single exchange on the transport. The response message need not be delivered as the response to the initial transport request, but can instead be delivered by the web service to a response endpoint or other location selected by the client, using a new connection originating from the service. In accordance with an embodiment, the client communicates with the web service via request messages that include a SOAP header, formatted according to an XML format, and conveyed using the HTTP. Each request message indicates who the message is from, and other parameters associated with the message. Each client making a request has an address associated with that client, which is configured to receive appropriate responses, and provide those responses to the original client application. The asynchronous transport automatically deploys, for a client, an endpoint reference that will ultimately receive corresponding response messages. Request messages issued from that client can include a WS-compliant addressing header which indicates that the response must go back to that endpoint. This allows the response to ultimately return to the client application in a manner consistent with the JAX-WS specification, without the developer having to change their original client application.

The system makes it easier for software developers to code their client applications to address complex asynchronous environments and features, such as clustering, while also providing a higher level quality of service.

BRIEF DESCRIPTION OF THE FIGURES/APPENDICES

DETAILED DESCRIPTION

Figure 1:
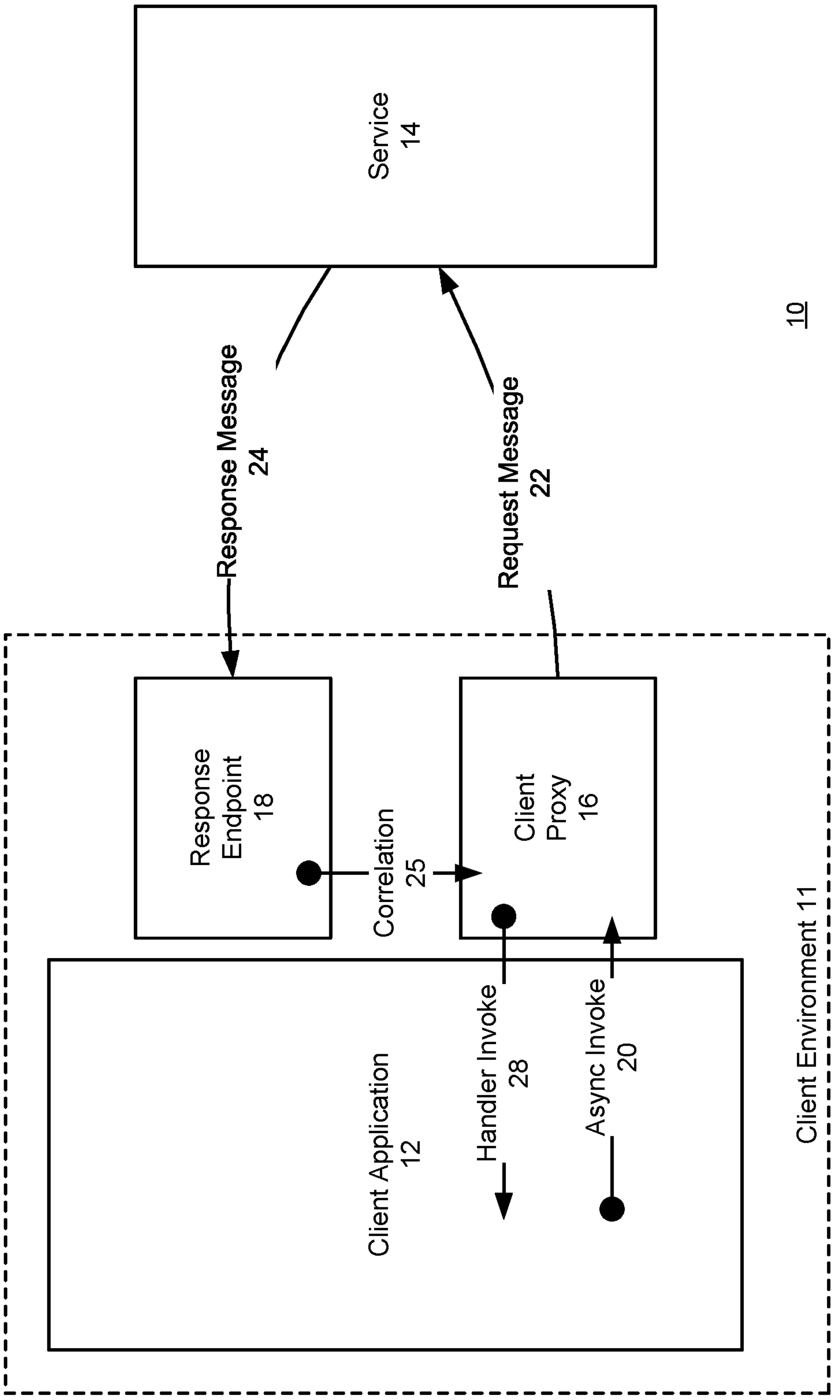
FIG. 1 illustrates a system for extending a web service environment to support scalable asynchronous clients, in accordance with an embodiment.

As described above, generally each web service includes an interface that is described in a Web Services Description Language (WSDL), which allows other systems to interact by sending requests to the interface, typically in the form of Simple Object Access Protocol (SOAP) messages, formatted according to an Extensible Markup Language (XML) format, and conveyed to the web service using the Hypertext Transfer Protocol (HTTP). As also described above, although the JAX-WS specification and associated reference implementation provides some support for enabling asynchronous clients, when the client is itself part of a larger application, or participates in a larger environment such as a cluster, where the needs are more sophisticated, the added complexity creates a burden on the developer in developing their applications, and can affect performance.

Disclosed herein are systems and methods for extending a web service environment to support scalable asynchronous clients. An asynchronous transport enables decoupling the delivery of an operation's request and response messages, from the request and response cycle of a single exchange on the transport. The response message need not be delivered as the response to the initial transport request, but can instead be delivered by the web service to a response endpoint or other location selected by the client, using a new connection originating from the service. In accordance with an embodiment, the client communicates with the web service via request messages that include a Simple Object Access Protocol (SOAP) header, formatted according to an Extensible Markup Language (XML) format, and conveyed using the Hypertext Transfer Protocol (HTTP). Each request message indicates who the message is from, and other parameters associated with the message. Each client making a request has an address associated with that client, which is configured to receive appropriate responses, and provide those responses to the original client application. The asynchronous transport automatically deploys, for a client, an endpoint reference (EPR) that will ultimately receive corresponding response messages. Request messages issued from that client can include a WS-compliant addressing header which indicates that the response must go back to that endpoint. This allows the response to ultimately return to the client application in a manner consistent with the Java API for XML Web Services (JAX-WS) specification, without the developer having to change their original client application. The system makes it easier for software developers to code their client applications to address complex asynchronous environments and features, such as clustering, while also providing a higher level quality of service (QOS).

In accordance with an embodiment, a client proxy associated with the client is configured so that each server response comes back to the appropriate response endpoint, and is then correlated with the client, for use by the original client application. Correlation typically requires that every request message includes a global unique id (UUID), and that responses similarly includes appropriate UUIDs. Previously, a developer might have needed to hard-wire a web service to accomplish this, essentially treating the inbound response as a service request. However, such an approach requires the use of WSDL to direct the inbound response, and is complicated internally. Instead, by configuring the client proxy to recognize endpoint references, coupled with correlation, the system can be used to support functionality and features such as reliable messaging. In accordance with an embodiment, the application can also use a request context or state, that can be correlated later to get back any state that it saved as part of issuing the request. Rules can be used to enable the automatic generation of endpoint references. These rules can be overridden or manually specified, depending on the particular use case desired. For example, not all requests are best handled asynchronously—in some instances a shorter request requiring a response may not require asynchronicity, and in those instances it may be preferable to block for the response.

In accordance with an embodiment, an asynchronous handler interface that supports the use of asynchronous handler instance can be provided. In some situations, particularly those in multiple server environments, with multiple request messages being communicated from clients at one server or JVM, and multiple responses being returned from another server, if a client running on a server makes an asynchronous request, and the server hosting the client fails or restarts, when that server restarts it might have inbound responses arriving from other entities in response to requests issued previous before the failure. The JAX-WS spec provides an asynchronous handler interface and can pass an instance of this when the client makes a request. To support JAX-WS those instances might have to be saved or serialized, however this does not scale well. In accordance with an embodiment, an alternative approach is to not have an instance associated just with the request, but instead tie the instance and handler to the client, and provide the handler with a context so it knows which request the handler should tie the response to. This provides better recovery whenever a JVM fails, and also scales better. The asynchronous handler instance for the client can exist on the same server as that client, but the handler comes back when the server reboots, and knows how to correlate the incoming requests.

The system is also useful in a clustered environment. Previously, an asynchronous handler instance may need to be moved from one cluster member to another, which is cumbersome. However, in accordance with an embodiment, by providing the handler with the above-described flexibility, it is sufficient to track the context to enable it to work within the cluster. In accordance with an embodiment, business data can also be persisted. When the application creates the request, it might need additional data to order to process the request. The system can store that application-specific data in a persistence layer, e.g., a database, JDBC, Coherence, a file store, a reliable messaging environment. Additionally, the system can support supports intra-cluster forwarding—when a storage is not cluster aware, this allows each member server of the cluster to forward responses to an endpoint on another server within the cluster when appropriate.

1. Client-Side Response Endpoint

FIG. 1 illustrates a system for extending a web service environment to support scalable asynchronous clients, in accordance with an embodiment. As shown in FIG. 1, the system 10 enables a client environment 11, which includes a client application 12, to communicate requests to a service 14, such a web service, via a client proxy 16. To make a request, the client application can invoke 20 on a web service feature and associated interface (referred to herein as an asynchronous client transport feature or AsyncClientTransportFeature, and described in further detail below), to send the request message 22 to the service. The client proxy automatically deploys a response endpoint 18, which is associated with an endpoint reference (EPR), and which will ultimately receive the response. In this manner, the EPR provides a mechanism for the client to configure a locally hosted endpoint and to automatically apply Web Services Addressing (WSA) non-anonymous ReplyTo headers to all non-one-way, outbound messages specifying that EPR, in addition to sending other WSA headers (e.g. MessageID), as appropriate. When the service subsequently generates a response message 24, that response is provided to the response endpoint indicated by the EPR, where it can be correlated 25 with the original request, and returned 28 to the invoking client.

Although the client application threading model and the transport model are technically orthogonal (i.e., it is possible to use the strongly-typed, synchronous methods on the port proxy with asynchronous transport, and vice-versa), an asynchronous transport is best used with asynchronous threading models. However, in accordance with an embodiment, to allow the client application to run unchanged, the use of synchronous threading models can also be supported. By default, the use of synchronous methods will use synchronous transport, even when the asynchronous transport functionality is enabled. An option can be provided to select the use of asynchronous transport when using synchronous method invocation.

In accordance with an embodiment, the client need only activate the AsyncClientTransportFeature, and the client-side response EPR is automatically selected. An appropriate response service implementation is then created and published, so that it is reachable via the ReplyTo EPR, and all of the pre-existing JAX-WS 2.1 client programming models continue to function (e.g. asynchronous polling, callback handler, dispatch, etc.). In some instances, clients can select their own response endpoint reference (EPR), and the automatically generated response service implementation will be published at a location reachable using that EPR.

Client-Provided Endpoint Support

In accordance with an embodiment, clients can specify that they do not want an automatically generated response service, but only wish to add WSA headers to outbound, non-oneway messages. In this case, outbound headers will be automatically added, but no service will be auto-published at the ReplyTo address. Supported client programming models include: Asynchronous polling invocation with no attempt to access Response object; Dispatch asynchronous polling invocation with no attempt to access Response object; Dispatch one-way invocation; Synchronous using synchronous transport option (default). Use of all other client programming models (e.g. synchronous using asynchronous transport option or callback handler) or access of the Response object will generate a runtime exception. Clients are responsible for ensuring that the response endpoint is published and available, prior to making outbound requests.

EPR Configuration and Generation

In accordance with an embodiment, clients may specify the endpoint address of the response service or use auto-generation, as described in further detail below:

Rules for Selecting a Response Service Endpoint Address

For standalone (off-server) clients, the selected address must be in the form of a URL (e.g. http://my-server:1234/SomeContext/SomeService), where the selected port is currently unused or has only been used by earlier deployments of JAX-WS services. No check is made to ensure that the given hostname or IP address correctly identifies the local machine as remote clients (i.e. called services performing callback) may have different DNS visibility. The client may specify "0" for the port value, which will specify the use of an ephemeral port. Outbound ReplyTo headers will contain the address exactly as given expect the port value will be replaced with the actual port selected at the bind operation.

For on-server clients, the selected address must identify a legal address (including all network channels and proxy addresses) of the server or the cluster address, if the current application is clustered. Ephemeral ports are not supported. The selected context (URL path) must be contained within the context of the current application or in an unused context. Specifically, the selected address may not use a context that is scoped to another deployed application.

Rules for Auto-Selecting a Response Service Endpoint Address

For standalone clients, auto-generated response service endpoint addresses must be in the format: http://<InetAddress.getLocalHost( ).toString( ) value>:0/<service-level uuid>/<uuid>, where the server address is the local default address as selected by java.net.InetAddress. An ephemeral port can be used. Servlet context (lead of URL path) is a UUID generated per Service object; and Service mapping (tail of URL path) is a UUID generated per client-side stub (port) object.

For on-server clients, auto-generated response service endpoint addresses must be in the following format: http://<current context address and port>/<context>/<target port>Response, wherein the current context address and port includes: Cluster address and port, if current application is clustered; Otherwise, default server address and port for the selected protocol; First network channel address for the given protocol, if no default address is defined; Context is the current servlet context, if running within an existing context, or a new context named by a UUID that is scoped to the application; and Target port is the port name of the service accessed by this client.

Timeout

In accordance with an embodiment, when a synchronous request (e.g. a normal, strongly-typed request using port proxy) is made using the asynchronous transport option, the client thread blocks until the response from the server is received. Since the system provides an asynchronous transport, the client thread blocks until the correlated inbound response message arrives on the response endpoint. In a Weblogic environment, this functionality honors the property weblogic.wsee.jaxws.JAXWSProperties.REQUEST_TIMEOUT, by interrupting the waiting client thread if no service response has been received in the timeframe. However, as with the synchronous transport use case, the default value of this property is "0", which means no timeout. In a non-reliable use case it will be possible for a client to be blocked waiting for a response that will never arrive from the service (e.g. because of a service-side failure) that would have been detected in the synchronous transport case because of a reset socket or HTTP failure code. For clients running on-server, this is mitigated because the client thread will belong to a server work manager group that detects and interrupts "stuck" threads. Robust clients should use a similar pattern, or use the asynchronous handler programming model defined below.

Support for Enabling Asynchronous Transport Using Policy Assertions

In a Weblogic environment that uses Weblogic Reliable Messaging (WS-RM), WS-RM and other WS-* features are enabled through WS-Policy assertions, such as policy attachments on the service WSDL. In accordance with an embodiment, WebLogic support for WS-RM includes enabling use of asynchronous transport implicitly without requiring changes to client source files or compiled applications. In accordance with an embodiment, pre-existing functionality will enable WS-* support based on policy at client stub creation, so this requirement is met if the WS-* initialization functionality can enable use of asynchronous transport by adding a feature to the client port without requiring other changes to the client application. The AsyncClientTransportFeature will support zero-argument constructor behavior that is appropriate for automatic enablement on or off-server. If a client application does provide an instance of AsyncClientTransportFeature during port stub creation, then that instance must be normative and must not be overridden by a feature instance implied by policy processing.

Auto-Generated Response Endpoint Address

In accordance with an embodiment, the AsyncClientTransportFeature will automatically generate response endpoint addresses that are valid and unique. Off-server, where there is no support for clustering, proxies, and network channels, the typical requirement is to generate a legal and addressable URL that is least likely to conflict. This is the reason for use of InetAddress.getLocalHost( ) and ephemeral ports. On-server, the typical requirement is to model the visibility of the current application and server, including use of clustering and proxy addresses. Response endpoints must be scoped within the current application.

Application of WSA Headers to Outbound Requests

In accordance with an embodiment, when asynchronous transport is enabled, all non-oneway outbound requests will include all required WSA headers, specifically including a ReplyTo header that specifies the EPR of the response endpoint. When accessing a conformat service, this will mean that response messages will be delivered to the ReplyTo address, and not delivered using a back-channel. Synchronous invocations (i.e. strongly-typed methods on port proxies) will use synchronous transport by default even when the asynchronous transport is enabled. The AsyncClientTransportFeature can include a constructor argument and a bean-property that selects the use of asynchronous transport with synchronous method invocations. A per-request BindingProvider request context value can also be provided that selects between synchronous and asynchronous transport for calls made with that context that overrides the feature-level property.

Publish Response Service

In accordance with an embodiment, during client port initialization, the AsyncClientTransportFeature will publish a response service at the selected response EPR, if needed. When or if the client port is disposed (java.io.Closeable.close( )), the response endpoint will be stopped and disposed. On-server, applications must be able to generate client port stubs, including port stubs that publish response endpoints at all customer-visible phases, including in application deployment listeners, initialization methods (e.g. @PostConstruct), and request time. All response endpoints must be stopped and disposed when the containing application is undeployed. In a Weblogic environment, the published service must support WS-* features (excluding features that are explicitly asynchronous transport aware, e.g. WSA, WS-RM), exactly as they would have been supported on the response message handling for synchronous transport. Specifically, this includes support for WS-Security policy and WS-SecureConversation (WS-SC) as defined by the applicable policy on the response messages for the original service.

Correlation of Request and Response Messages

In order for client programming models to operate correctly when asynchronous transport is used, inbound messages on the response endpoint must be correlated with the appropriate request so that the appropriate asynchronous handler is called, Response object is updated, or application thread is unblocked. In accordance with an embodiment, the MessageID header sent with the outgoing request and the RelatesTo header on the inbound response can be used to provide this correlation. If an inbound message arrives without correlation (RelatesTo header missing or value does not match known request MessageID value), then a SOAP fault is returned to the calling service.

Support for Request Timeout

In a Weblogic environment, synchronous calls (threading model) that use underlying asynchronous transport should respect the weblogic.wsee.jaxws.JAXWSProperties.REQUEST_TIMEOUT request context value. This value is an integer representing the desired request timeout in milliseconds. If a response does not arrive before the request timeout expires, then the correlation information will be cleared and the client thread will be interrupted with a java.lang.InterruptedException. From the viewpoint of the client application, this is the same behavior as when a synchronous SOAP/HTTP request times out. On-server clients have additional protection because the underlying thread will be part of a work manager and this manager has support for interrupting stuck threads after a configurable timeout period. If the work manager interrupts the waiting thread the correlation state must be cleared just as it is in the request timeout interrupt.

Support for Targeting Client-Provided Endpoint

In accordance with an embodiment, clients may use the AsyncClientTransportFeature to target an already published response service, by specifying the ReplyTo EPR that is either managed by the client or that is remote. In this case, no new response service is published, and there is no automatic correlation of request and response processing. The only functionality provided will be the automatic inclusion of appropriate WSA headers in outbound messages.

Java Programming Interface

In accordance with an embodiment, provided below is an example of a Java programming interface for the AsyncClientTransportFeature described above. The example Java programming interface is provided for the purposes of illustration and description, and is not intended to be exhaustive or to limit the invention to the precise forms disclosed.

public class AsyncClientTransportFeature
extends javax.xml.ws.WebServiceFeature
implements com.sun.xml.ws.binding.ImpliesWebServiceFeature The AsyncClientTransportFeature designates a client that accesses the service through WS-Addressing and asynchronous transport. Use of this feature will by default publish a response endpoint to receive inbound response messages and correlate request and response exchanges. Clients may create multiple ports or Dispatch instances from the same Service instance that share the same response endpoint by specifying the same AsyncClientTransportFeature instance; however, at most one of the port instances may specify AsyncClientHandlerFeature.

AsyncClientTransportFeature
public AsyncClientTransportFeature( )

This function creates an AsyncClientTransportFeature. Client proxies created using this feature will publish and use an asynchronous response endpoint with an auto-selected address.

AsyncClientTransportFeature
public AsyncClientTransportFeature(java.lang.Object context)

This function creates an AsyncClientTransportFeature that will select an asynchronous response endpoint address within the scope of a pre-existing context. The context parameter may be an instance of javax.servlet.ServletContext. Other context types are implementation dependent.

Parameters: context—Existing context that will scope response endpoint.

AsyncClientTransportFeature
public AsyncClientTransportFeature(java.lang.Object context,
boolean useAsyncWithSyncInvoke)

This function creates an AsyncClientTransportFeature that will select an asynchronous response endpoint address within the scope of a pre-existing context. The context parameter may be an instance of javax.servlet.ServletContext. Other context types are implementation dependent.

Parameters: context—Existing context that will scope response endpoint;

useAsyncWithSyncInvoke—Determines if async transport will be used with sync invocation.

AsyncClientTransportFeature
public AsyncClientTransportFeature(java.lang.String address)

This function creates an AsyncClientTransportFeature that will publish an asynchronous response endpoint at the given address.

Parameters: address—Asynchronous response endpoint address.

AsyncClientTransportFeature public AsyncClientTransportFeature(javax.xml.ws.wsaddressing.

W3CEndpointReference replyTo)

This function creates an AsyncClientTransportFeature that will publish an asynchronous response endpoint at the address specified by the given endpoint reference. This endpoint reference will be used for outgoing ReplyTo headers.

Parameters: replyTo—Asynchronous response endpoint reference.

AsyncClientTransportFeature public AsyncClientTransportFeature(javax.xml.ws.wsaddressing.

W3CEndpointReference replyTo, javax.xml.ws.wsaddressing.

W3CEndpointReference faultTo)

This function creates an AsyncClientTransportFeature that will publish an asynchronous response endpoint at the address specified by the given replyTo endpoint reference. The replyTo and faultTo endpoint references will be used for outgoing ReplyTo and FaultTo headers, respectively.

Parameters: replyTo—Asynchronous response endpoint reference; faultTo—FaultTo endpoint reference.

AsyncClientTransportFeature public AsyncClientTransportFeature(java.lang.String address, boolean doPublish)

This function creates an AsyncClientTransportFeature. If doPublish is true then an asynchronous response endpoint will be published at the given address. Otherwise, no endpoint will be published, but WSA headers will be added to outbound, non-oneway request messages.

Parameters: address—Asynchronous response endpoint address; doPublish—Determines if response endpoint will be auto-published.

AsyncClientTransportFeature public AsyncClientTransportFeature(javax.xml.ws.wsaddressing.

W3CEndpointReference replyTo, boolean doPublish)

This function creates an AsyncClientTransportFeature. If doPublish is true then an asynchronous response endpoint will be published at the address specified by the replyTo endpoint reference. Otherwise, no endpoint will be published, but WSA headers will be added to outbound, non-oneway request messages.

Parameters: replyTo—Asynchronous response endpoint reference; doPublish—Determines if response endpoint will be auto-published.

AsyncClientTransportFeature public AsyncClientTransportFeature(javax.xml.ws.wsaddressing.

W3CEndpointReference replyTo, javax.xml.ws.wsaddressing.

W3CEndpointReference faultTo, boolean doPublish)

This function creates an AsyncClientTransportFeature. If doPublish is true then an asynchronous response endpoint will be published at the address specified by the replyTo endpoint reference. Otherwise, no endpoint will be published, but WSA headers will be added to outbound, non-oneway request messages. The replyTo and faultTo endpoint references will be used for outgoing ReplyTo and FaultTo headers, respectively.

Parameters: replyTo—Asynchronous response endpoint reference; faultTo—FaultTo endpoint reference; doPublish—Determines if response endpoint will be auto-published.

AsyncClientTransportFeature public AsyncClientTransportFeature(java.lang.String address, boolean doPublish, boolean useAsyncWithSyncInvoke)

This function creates an AsyncClientTransportFeature. If doPublish is true then an asynchronous response endpoint will be published at the given address. Otherwise, no endpoint will be published, but WSA headers will be added to outbound, non-oneway request messages.

Parameters: address—Asynchronous response endpoint address; doPublish—Determines if feature deploys response endpoint or if client application is responsible; useAsyncWithSyncInvoke—Determines if async transport will be used with sync invocation.

AsyncClientTransportFeature public AsyncClientTransportFeature(javax.xml.ws.wsaddressing.

W3CEndpointReference replyTo, boolean doPublish,
boolean useAsyncWithSyncInvoke)

This function creates an AsyncClientTransportFeature. If doPublish is true then an asynchronous response endpoint will be published at the address specified by the replyTo endpoint reference. Otherwise, no endpoint will be published, but WSA headers will be added to outbound, non-oneway request messages.

Parameters: replyTo—Asynchronous response endpoint reference; doPublish—Determines if response endpoint will be auto-published; useAsyncWithSyncInvoke—Determines if async transport will be used with sync invocation.

AsyncClientTransportFeature public AsyncClientTransportFeature(javax.xml.ws.wsaddressing.

W3CEndpointReference replyTo, javax.xml.ws.wsaddressing.

W3CEndpointReference faultTo, boolean doPublish,
boolean useAsyncWithSyncInvoke)

This function creates an AsyncClientTransportFeature. If doPublish is true then an asynchronous response endpoint will be published at the address specified by the replyTo endpoint reference. Otherwise, no endpoint will be published, but WSA headers will be added to outbound, non-oneway request messages. The replyTo and faultTo endpoint references will be used for outgoing ReplyTo and FaultTo headers, respectively.

Parameters: replyTo—Asynchronous response endpoint reference; faultTo—FaultTo endpoint reference; doPublish—Determines if response endpoint will be auto-published; useAsyncWithSyncInvoke—Determines if async transport will be used with sync invocation.

getEndpointReference public <T extends javax.xml.ws.EndpointReference> T
getEndpointReference(java.lang.Class<T> clazz,
org.w3c.dom.Element . . . referenceParameters)

This function generates endpoint reference for response endpoint.

Parameters: clazz—Endpoint reference type; referenceParameters—Reference parameters Returns: Endpoint reference for response endpoint.

getID public java.lang.String getID( )

Returns feature ID isUseAsyncWithSyncInvoke public boolean isUseAsyncWithSyncInvoke( )

setUseAsyncWithSyncInvoke public void setUseAsyncWithSyncInvoke(boolean useAsyncWithSyncInvoke)

2. Asynchronous Handler Interface

Figure 2:
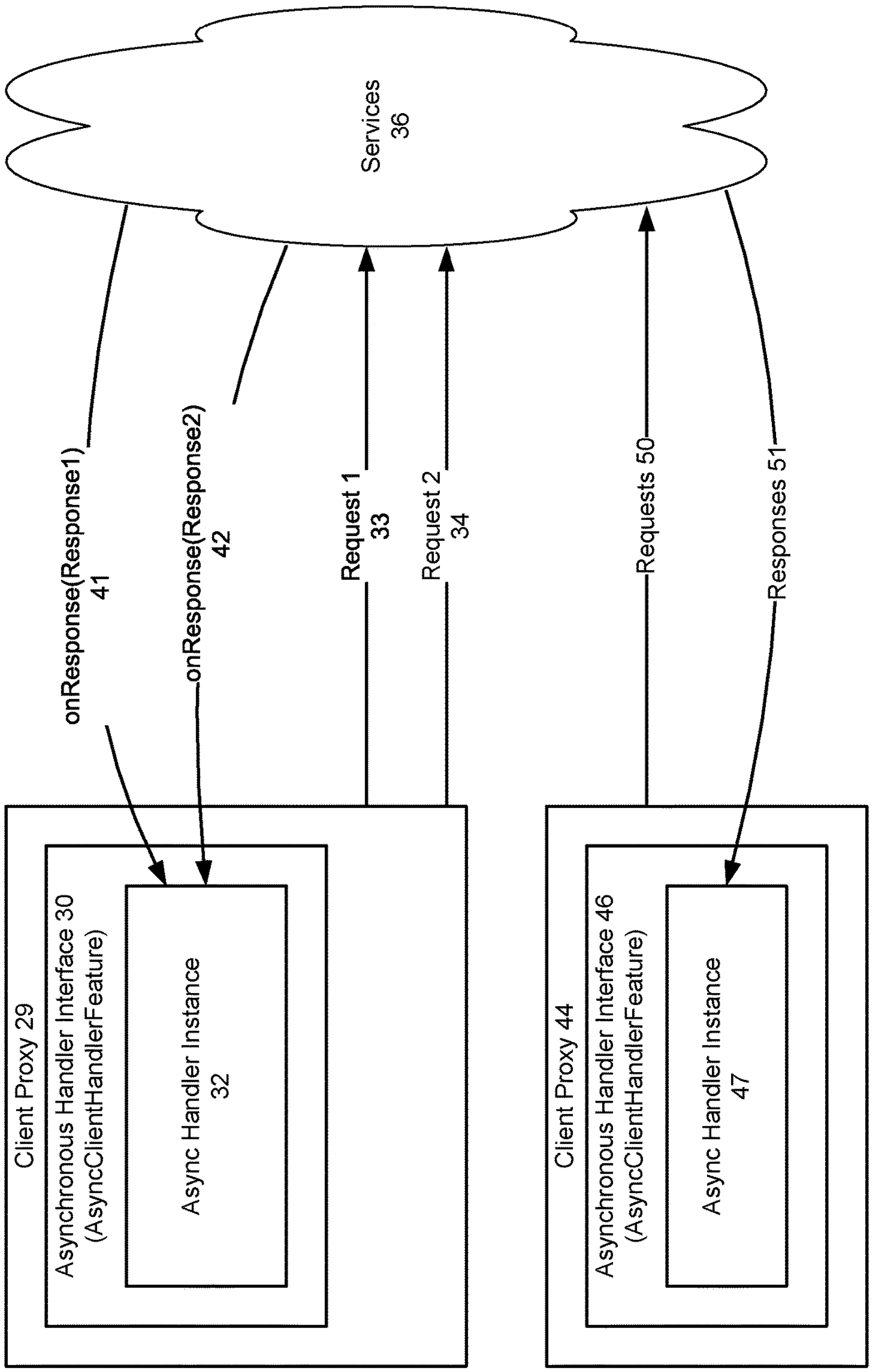
FIG. 2 illustrates the use of asynchronous handler instances, in accordance with an embodiment.

FIG. 2 illustrates the use of asynchronous handler instances, in accordance with an embodiment. As shown in FIG. 2, an asynchronous client handler feature or AsyncClientHandlerFeature includes that each client proxy 29, 44 provides an asynchronous handler interface 30, 36, which allows that client proxy to create asynchronous handler instances that will then handle requests and responses between the client application and the services 36. The AsyncClientHandlerFeature provides an updated client programming model more appropriate for surviving, e.g. JVM restart. When client-side tooling is invoked (clientgen/wsimport) and the asynchronous operation variants are requested, the tooling creates an additional Java interface appropriate for the implementation of an asynchronous handler. This interface has handler methods that accept the appropriate Response objects as parameters for each non-oneway operation on the matching port-type interface. Clients then implement this interface and set an instance of the asynchronous handler on the port using a web service feature and associated interface named AsyncClientHandlerFeature. Requests 33, 34, 50 are received, via the asynchronous handler instance, at the service, which then generate responses 41, 42, 51 which are returned to the asynchronous handler instance, where they can be correlated with the invoking client.

When the AsyncClientHandlerFeature is set, the following client programming models are supported: Asynchronous callback handler where the handler parameter is null; Dispatch callback handler where the handler parameter is null; Asynchronous polling; Dispatch polling; Dispatch oneway; Synchronous. Regular, synchronous calls will still be supported; however, the response message will return to the calling client thread and not to the asynchronous handler. Use of any other client programming model, such as asynchronous callback handler with a valid, non-null handler, will generate a runtime exception. This is so that there is no inconsistency between when an asynchronous response will be delivered to the per-call handler or to the asynchronous handler configured by the feature.

In accordance with an embodiment, the Java interface name will be based on the port type interface name, with the format being: <SEI name>+"AsyncHandler". For instance, the port type interface "AddNumbersPortType" will be paired with the handler interface "AddNumbersPortTypeAsyncHandler". As an example, if there was an AddNumbersPortType SEI with a method:

public int addNumbers(int opA, int opB) throws MyException

Then AddNumbersPortType would also have methods:

public Future<?> addNumbersAsync(int opA, int opB, AsyncHandler
<AddNumbersResponse>)

public Response<AddNumbersResponse> addNumbersAsync(int opA, int opB)

The response handler interface would be named AddNumbersPortTypeAsyncHandler, and will contain the method:

public void onAddNumbersResponse (Response<AddNumbersResponse>)

Note that each asynchronous variant that takes or returns the Response<AddNumbersResponse> object has lost the explicit throws clause for MyException; however, the exception is still accessible. The get( ) method of the Response object can throw java.util.concurrent.ExecutionException and this will contain the MyException as its cause. The primary difference between this client programming model and the standard asynchronous callback handler model described above, is that the client cannot specify different handler instances per call and, therefore, cannot maintain correlation state using instance state. When response messages arrive at the response endpoint they will be processed by the asynchronous handler rather than by a request-specific handler. To enable this, the asynchronous handler must be re-entrant.

When a JVM restart occurs, and the client is re-created, inbound response messages correlating to requests made prior to JVM restart may be the first messages received, and may arrive in advance of any new request messages being issued by the client. This is particularly likely in the WS-RM use case when reliability policy applies to response messages directed to the client.

In accordance with an embodiment, the Asynchronous Handler defines a new client-side programming model that uses a single handler instance rather than per-request AsyncHandler instances or application polling. Client applications manage correlation between requests and responses using the Request and Response Correlation feature defined below. Because no per-request handler is used, the model can be used to survive JVM restart.

Additionally, in a Weblogic environment, weblogic.wsee.jaxws.JAXWSProperties will define the properties MESSAGE_ID and RELATES_TO. Client applications may set MESSAGE_ID on the request context to override the generation of the per-request MessageID header and may read the value of RELATES_TO from the response context. This will allow client applications to do their own request/response correlation.

Generate Handler Interface in Client-Side Tooling

When asynchronous client API's are requested, the client-side tooling generates an additional interface for the async handler. No other switches or configuration will be necessary in order to generate this interface. The handler interface will belong to the same package as the matching port interface and will be named <port interface name>+"AsyncHandler".

For each asynchronous callback handler method on the port type interface of the form:

```
@WebMethod(operationName=" . . . ")
@RequestWrapper(localName=" . . . ", targetNamespace=" . . . ", className=
" . . . ")
@ResponseWrapper(localName=" . . . ", targetNamespace=" . . . ", className=
"ResponseBean")
public Future<?>nameAsync(
  @WebParam(name=" . . . ", targetNamespace=" . . . ")
  SomeType parameter1,
  @WebParam(name="asyncHandler", targetNamespace=" ")
  AsyncHandler<ResponseBean> asyncHandler);
```

The handler interface will contain a method:

```
public void onNameResponse(
  Response<ResponseBean> response);
```

where Name is equal to the value of name with the leading character converted to upper-case, if necessary. It will be noted that, like the pre-existing asynchronous handler methods on the port type interface, this handler interface also does not have explicit throws clause values for fault types. However, at runtime, calls to response.get( ) can throw java.util.concurrent.ExecutionException and these exception instances are wrappers for the strongly-typed fault exceptions and will (in either handler model) contain the appropriate exception as its cause.

Invoke Handler Instance Methods During Response Processing

When a client port proxy is initialized with an instance of AsyncClientHandlerFeature, the application must not call asynchronous methods specifying a non-null handler. Use of inappropriate programming models will generate a runtime exception. When a response message arrives and after the completion of response processing (e.g. WSS or WS-RM handling), the correct handler method will be invoked passing a Response object that wraps the inbound message or fault. Synchronous calls will continue to operate as if the handler feature were not defined and synchronous responses will continue to return to the calling thread.

Java Programming Interface

In accordance with an embodiment, provided below is an example of a Java programming interface for the AsyncClientHandlerFeature described above. The example Java programming interface is provided for the purposes of illustration and description, and is not intended to be exhaustive or to limit the invention to the precise forms disclosed.

public class AsyncClientHandlerFeature
extends javax.xml.ws.WebServiceFeature

The class AsyncClientHandlerFeature designates an asynchronous handler instance that will be invoked upon the receipt of response messages. This model is in contrast to the call-specific asynchronous handler support, which allows per-request instances of handlers.

AsyncClientHandlerFeature public AsyncClientHandlerFeature(java.lang.Object handler)

This function creates an AsyncClientHandlerFeature. Asynchronous responses returned to the client proxy using this feature will be directed to this handler instance.

Parameters: handler—Common handler instance.

3. Request and Response Correlation

Figure 3:
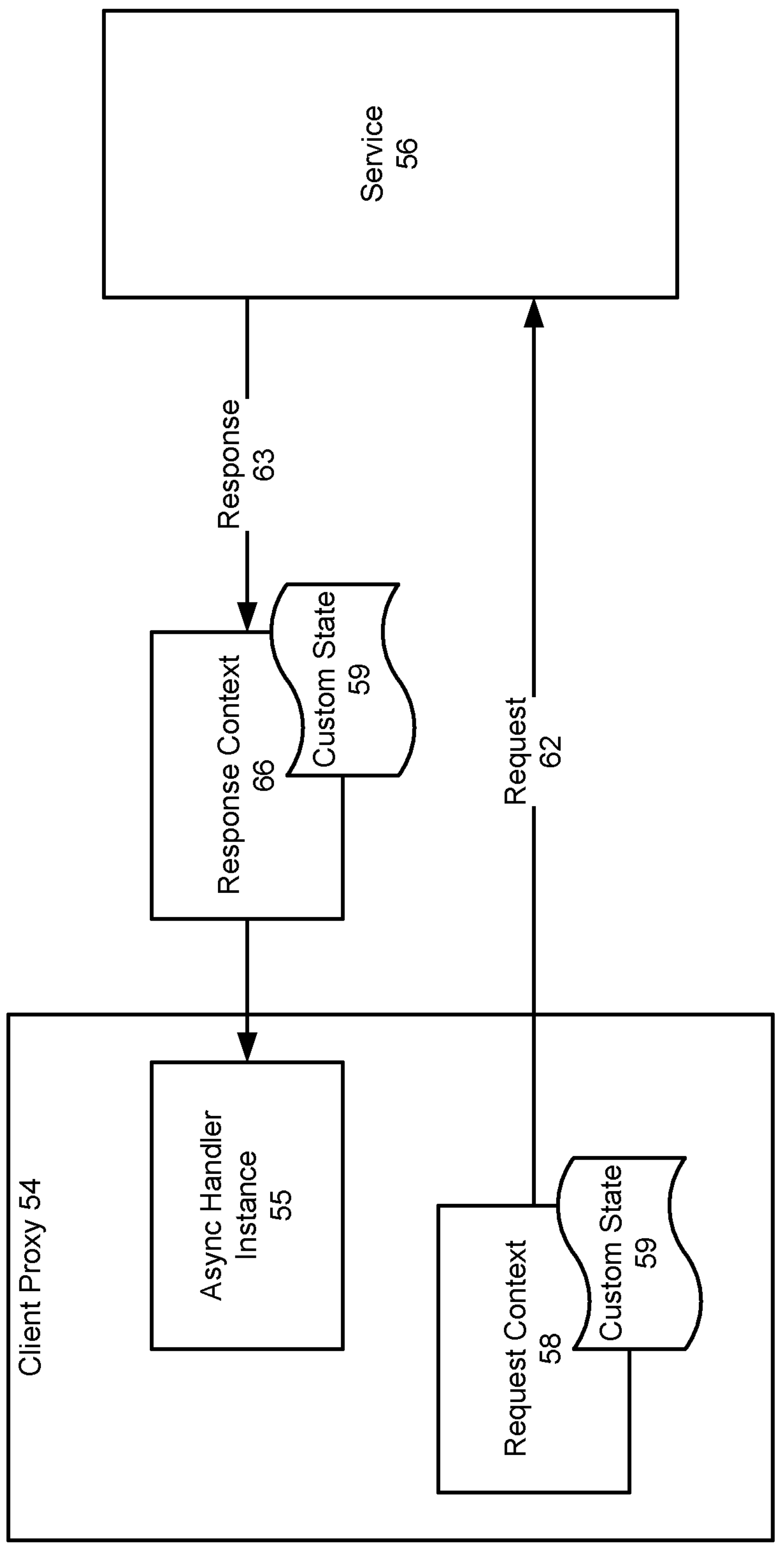
FIG. 3 illustrates the use of request/response contexts and custom state, in accordance with an embodiment.

FIG. 3 illustrates the use of request/response contexts and custom state, in accordance with an embodiment. As shown in FIG. 3, a client proxy 54 using an async handler instance 55 to provide requests to a service, can include a request context 58, and optionally a custom state 59, that can be provided with the request 62, such that the response 63 can include a response 66, and optionally the custom state 59. Because instance state cannot be used to correlate requests and responses, this feature provides a simple persistence mechanism that clients may use to store business data associated with a request/response exchange. Clients can use a key on the request context to access a map. Clients can put any desired serializable objects into the map. When the correlated response message arrives at the async handler, the response context will contain an equivalent copy of the map, including rehydrated object instances.

```
Map<String, Object> requestContext=
    ((BindingProvider) port).getRequestContext( );
Map<String, Object> data=
    (Map<String, Object>) requestContext.get(
    JAXWSProperties.PERSISTENT_CONTEXT)
data.put("mykey", mySerializableObject);
```

Other client applications may simply want to do their own correlation and (optionally) persistence. To enable this use case, a request context value can be defined to set the outgoing MessageID header in the request context and another value will be defined to read the RelatesTo header from the response context. Request and response correlation provides a mechanism for client applications to associate request-time state information with later response processing without requiring the use of asynchronous handler instance state.

Automatic Map Persistence and Correlation

In accordance with an embodiment, the request context will contain a non-null Map instance into which client applications can place entries with String key values and Serializable object instance values. When the asynchronous handler is invoked, the response context map available from the Response object will contain a map with equivalent entries. Non-serializable map entries will be ignored. In a Weblogic environment, the map will be available in the request and response context at the key weblogic.wsee.jaxws.JAXWSProperties.PERSISTENT_CONTEXT.

Client-Side Policy and Policy Override

Some versions of WebLogic WSS and WS-SecurityPolicy include a client-side feature that is used to override the effective security policy. This pre-existing feature, weblogic.jws.jaxws.ClientPolicyFeature, can be supported by the asynchronous transport functionality defined herein. Clients will honor security policy that applies to response messages, whether from the WSDL or from the ClientPolicyFeature, as the messages arrive at the response endpoint. From a security perspective, messages must be treated identically in the asynchronous response endpoint use case as they would have been treated by the pre-existing synchronous transport functionality. If clients provide their own implementation of the response endpoint (and do not use the auto-generated implementation) then no automatic support for the correct WS-SecurityPolicy is provided; however, implementers may still use ClientPolicyFeature. The ClientPolicyFeature, when used with a client port proxy using AsyncClientTransportFeature and AsyncClientHandlerFeature, will apply to the response handling that executes prior to invoking the asynchronous handler instance.

4. Response Endpoint Clustering

Figure 4:
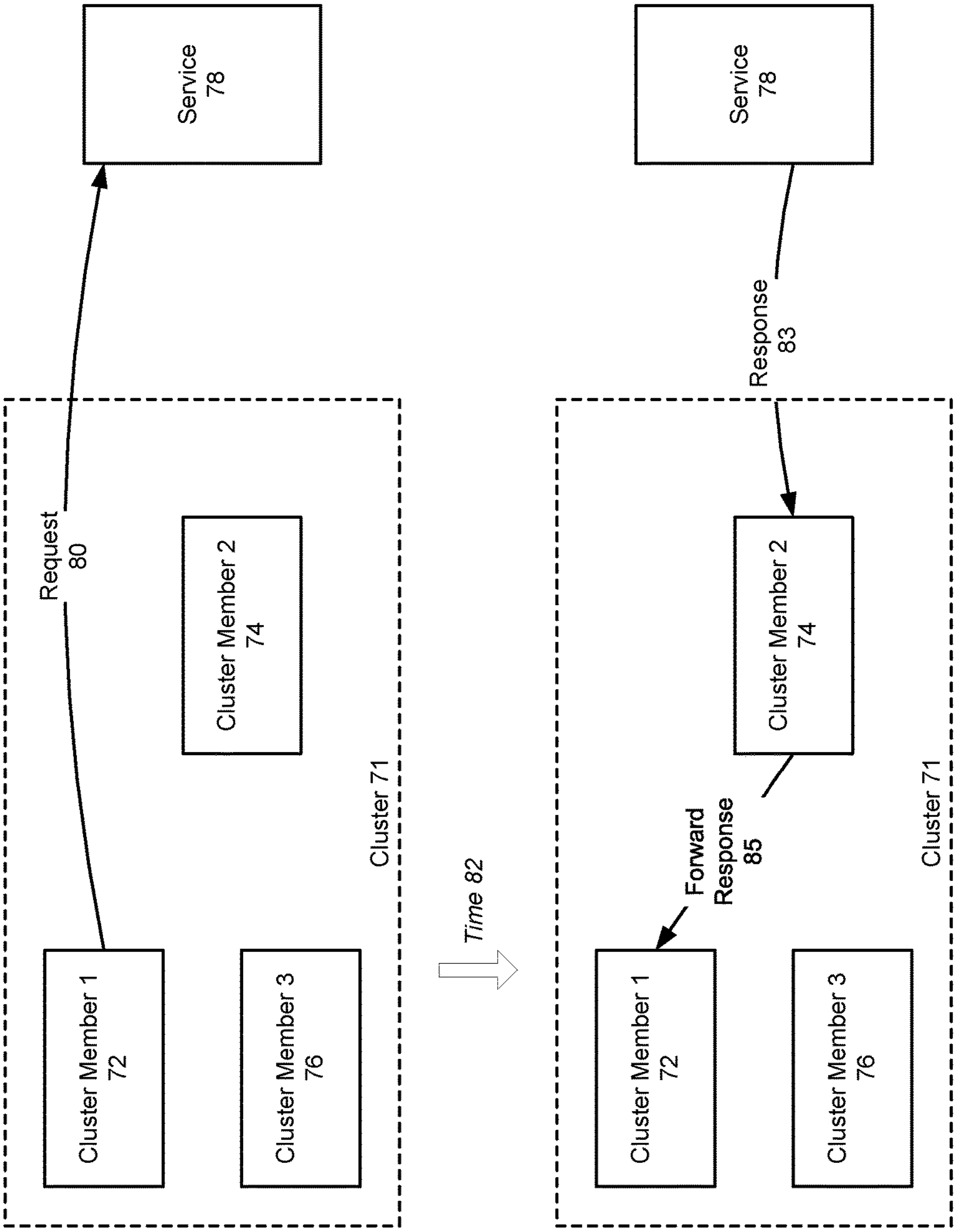
FIG. 4 illustrates how the system can be used with a clustered environment, in accordance with an embodiment.

FIG. 4 illustrates how the system can be used with a clustered environment, in accordance with an embodiment. When a response endpoint is deployed in a cluster and outbound request messages specify a ReplyTo EPR that includes the cluster address, response messages may arrive at a cluster member that is different from the member that made the initial request. The pre-existing WebLogic Server JAX-RPC functionality resolves this state management problem by including a reference parameter in the outgoing ReplyTo header that identifies the originating cluster member and then response messages are internally forwarded from the receiving member to the originating member, if needed. If the originating member is down or unavailable, the request (that is delivering the asynchronous response) is failed and WS-RM protocols are responsible for retrying delivery when the originating member is restarted or migrated. As shown in FIG. 4, in those embodiments which include cluster 71, having a plurality of cluster members 72, 74, 76, accessing a service 78, when a request 80 is communicated from one member of the cluster to the service, but, after a period of time 83, the response 83 is received at a different member of the cluster, the response can be forwarded 85 to the intended recipient.

Server Identity Reference Parameter and Intra-Cluster Forwarding

In accordance with an embodiment, the cluster member identity reference parameter included in outgoing ReplyTo EPR's will be identified by a QName by namespace "http://www.oracle.com/wsee/cluster" and "MemberIdentity". The value of the reference parameter will be the ServerMBean name. This name can be used with weblogic.protocol.URLManager to calculate the URL of the cluster member for the appropriate protocol. When a message carrying a MemberIdentity header arrives on a response endpoint and the receiving cluster member is not the server identified by the header, the receiving cluster member will lookup the URL of the identified member and forward the request. The receiving cluster member will wait for a response from the identified member, which typically would be an HTTP 202 (Oneway) status code and return that value to the caller. If the receiving cluster member catches an exception from the identified member client stub, then this exception must be wrapped and thrown as a WebService-Exception back to the client, generating the appropriate SOAP fault over the wire.

5. Process for Use Client-Side Response Endpoint

Figure 5:
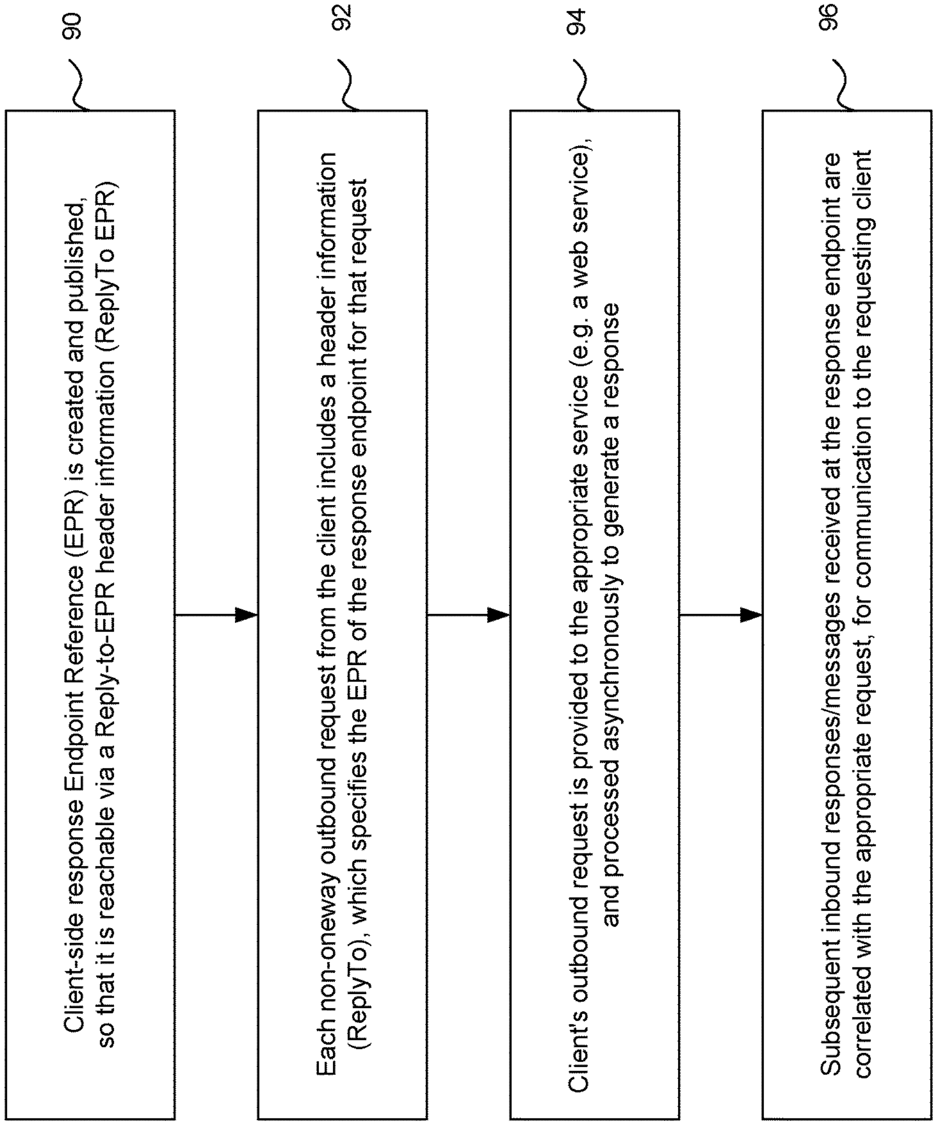
FIG. 5 is a flowchart that illustrates a method for extending a web service environment to support scalable asynchronous clients, in accordance with an embodiment.

FIG. 5 is a flowchart that illustrates a method for extending a web service environment to support scalable asynchronous clients, in accordance with an embodiment. As shown in FIG. 5, at step 92, when the client application communicates a request to a web service, a client-side response Endpoint Reference (EPR) is created and published, so that it is reachable via a Reply-to-EPR header information (ReplyTo EPR). At step 94, each non-oneway outbound request from the client to the service includes a header information (ReplyTo), which specifies the EPR of the response endpoint for that request. At step 96, the client's outbound request is provided to the appropriate service (e.g. a web service), and processed asynchronously to generate a response. At step 98, subsequent inbound responses/messages received at the response endpoint are correlated with the appropriate request, for communication to the original requesting client application.

The present invention may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a non-transitory storage medium or computer readable medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. Many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalents.

What is claimed is:

1. A system for extending a synchronous web service environment to support scalable asynchronous requests to clients, comprising:

one or more computers that provide a web service, wherein the web service is configured to generate a response to a request from a client;

a client environment at the client, which includes an interface of the web service including an asynchronous client transport feature, and client proxy;

wherein a client application executing at the client invokes on a constructor of the asynchronous client transport feature to send an asynchronous outbound request message to the web service, and wherein the client provides an argument to the constructor, the argument indicating the use of asynchronous transport via synchronous method invocations of synchronous methods of the web service;

wherein the client proxy deploys a response endpoint which specifies an endpoint reference (EPR), and wherein the EPR includes a response service endpoint address;

wherein the client application includes in the outbound request message a Web Services Addressing (WSA) header, and wherein the WSA header includes the response service endpoint address of the EPR;

wherein the response endpoint receives an inbound response message from the web service, and wherein the inbound response message is addressed to the response service endpoint address of the EPR; and wherein the client proxy correlates the inbound response message with the outbound request message.

2. The system of claim 1, wherein the asynchronous client transport feature publishes a response service at the selected response EPR.

3. The system of claim 1, wherein, the web service environment is an ORACLE WEBLOGIC environment, and wherein the synchronous methods of the web service are methods provided by the WEBLOGIC environment.

4. The system of claim 3, wherein the WEBLOGIC environment provides synchronous transport via the WEBLOGIC Reliable Messaging service.

5. The system of claim 1, wherein the client specifies the response service endpoint address.

6. The system of claim 1, wherein the system further comprises an asynchronous client handler feature which allows the client proxy to create asynchronous handler instances that handle the inbound response message.

7. The system of claim 1, wherein the interface is a Java programming interface for use by the client application.

8. The system of claim 1, wherein the outbound request message includes a request context.

9. The system of claim 1, wherein the outbound request message specifies a response service endpoint address of a member of a cluster to which the client belongs.

10. A method for extending a synchronous web service environment to support scalable asynchronous requests to clients, comprising the steps of:

providing at one or more computers a web service, wherein the web service is configured to generate a response to a request from a client;

providing a client environment at the client, which includes an interface of the web service including an asynchronous client transport feature, and a client proxy;

invoking, by a client application executing at the client, a constructor of the asynchronous client transport feature to send an asynchronous outbound request message to the web service wherein the client provides an argument to the constructor, the argument indicating the use of asynchronous transport via synchronous method invocations of synchronous methods of the web service;

deploying, by the client proxy, a response endpoint which specifies an endpoint reference (EPR), the EPR including a response service endpoint address;

including, by the client application in the outbound request message, a Web Services Addressing (WSA) header, and wherein the WSA header includes the response service endpoint address of the EPR;

receiving, by the response endpoint, an inbound response message from the web service, wherein the inbound response message is addressed to the response service endpoint address of the EPR; and correlating, by the client proxy, the inbound response message with the outbound request message.

11. The method of claim 10, wherein the asynchronous client transport feature publishes a response service at the selected response EPR.

12. The method of claim 10, wherein, the web service environment is an ORACLE WEBLOGIC environment, and wherein the synchronous methods of the web service are methods provided by the WEBLOGIC environment.

13. The method of claim 12, wherein the WEBLOGIC environment provides synchronous transport via the WEBLOGIC Reliable Messaging service.

14. The method of claim 10, wherein the client specifies the response service endpoint address.

15. The method of claim 10, wherein the system further comprises an asynchronous client handler feature which allows the client proxy to create asynchronous handler instances that handle the inbound response message.

16. The method of claim 10, wherein the interface is a Java programming interface for use by the client application.

17. The method of claim 10, wherein the outbound request message includes a request context.

18. The method of claim 10, wherein the outbound request message specifies a response service endpoint address of a member of a cluster to which the client belongs.

19. A non-transitory computer readable storage medium, including instructions stored thereon, which when read and executed by a computer system, cause the computer system to perform the steps comprising:

providing at one or more computers a web service, wherein the web service is configured to generate a response to a request from a client;

providing a client environment at the client, which includes an interface of the web service including an asynchronous client transport feature, and a client proxy;

invoking, by a client application executing at the client, a constructor of the asynchronous client transport feature to send an asynchronous outbound request message to the web service wherein the client provides an argument to the constructor, the argument indicating the use of asynchronous transport via synchronous method invocations of synchronous methods of the web service;

deploying, by the client proxy, a response endpoint which specifies an endpoint reference (EPR), the EPR including a response service endpoint address;

including, by the client application in the outbound request message, a Web Services Addressing (WSA) header, and wherein the WSA header includes the response service endpoint address of the EPR;

receiving, by the response endpoint, an inbound response message from the web service, wherein the inbound response message is addressed to the response service endpoint address of the EPR; and correlating, by the client proxy, the inbound response message with the outbound request message.

* * * * *

UNITED STATES PATENT AND TRADEMARK OFFICE
CERTIFICATE OF CORRECTION

PATENT NO. : 10,318,358 B2
APPLICATION NO. : 15/711610
DATED : June 11, 2019
INVENTOR(S) : Eberhard It is certified that error appears in the above-identified patent and that said Letters Patent is hereby corrected as shown below:

In the Claims

In Column 16, Line 3, in Claim 1, after “and” insert -- a --.

Signed and Sealed this
Twenty-first Day of July, 2020

Andrei Iancu
*Director of the United States Patent and Trademark Office*